(12) United States Patent
Kubo et al.

(10) Patent No.: US 11,956,396 B2
(45) Date of Patent: Apr. 9, 2024

(54) INFORMATION PROCESSING APPARATUS FOR EVALUATING PERFORMANCE OF COMBINATIONS OF PROCESSES

(71) Applicant: FUJIFILM BUSINESS INNOVATION CORP., Tokyo (JP)

(72) Inventors: Shusaku Kubo, Kanagawa (JP); Junichi Shimizu, Kanagawa (JP); Kosuke Tomokuni, Kanagawa (JP); Mamiko Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 481 days.

(21) Appl. No.: 17/156,855

(22) Filed: Jan. 25, 2021

(65) Prior Publication Data

US 2022/0067452 A1 Mar. 3, 2022

(30) Foreign Application Priority Data

Sep. 2, 2020 (JP) ................................. 2020-147521

(51) Int. Cl.
*H04N 1/00* (2006.01)
(52) U.S. Cl.
CPC ..... *H04N 1/00949* (2013.01); *H04N 1/00039* (2013.01); *H04N 1/00047* (2013.01); *H04N 1/00076* (2013.01)

(58) Field of Classification Search
USPC ........................................................ 358/1.15
See application file for complete search history.

(56) References Cited

U.S. PATENT DOCUMENTS

| 2011/0164807 | A1* | 7/2011 | Mitsui | ..................... G06V 10/96 382/145 |
| 2017/0013166 | A1* | 1/2017 | Katsuyama | .......... G06K 15/102 |
| 2022/0070325 | A1* | 3/2022 | Kubo | .................. H04N 1/00424 |
| 2022/0076370 | A1* | 3/2022 | Kawai | ................... G06T 7/0002 |

FOREIGN PATENT DOCUMENTS

JP 5476752 B2 4/2014

* cited by examiner

*Primary Examiner* — Jacky X Zheng
(74) *Attorney, Agent, or Firm* — Oliff PLC

(57) ABSTRACT

An information processing apparatus includes a processor configured to evaluate a performance of each of a plural combinations of processes, each combination including a series of processes, the plural combinations being included in plural processes, the series of processes being configured to be performed on an image, the performance being evaluated on a basis of a result of performing the series of processes on a test image for each combination, and output an evaluation result for at least two combinations.

18 Claims, 6 Drawing Sheets

FIG. 4

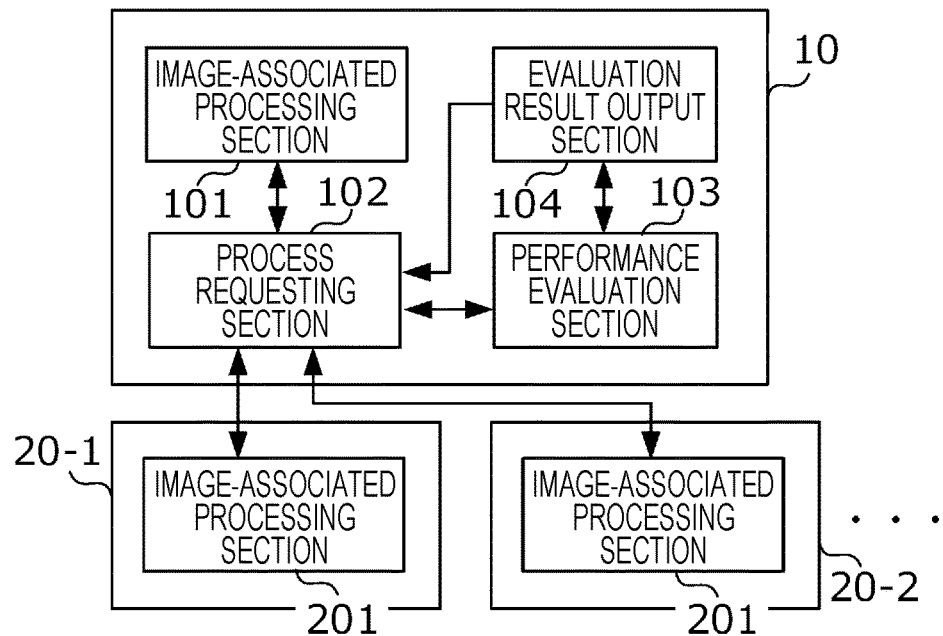

FIG. 5

| OPERATION SCREEN | | |
|---|---|---|
| IMAGE PROCESSING APPARATUS | EXTERNAL APPARATUS | |
| · PRINTING PROCESS<br>· COPYING PROCESS<br>· SCANNING PROCESS<br>· FAXING PROCESS | · PRE-PROCESS (1)<br>· CHARACTER RECOGNITION PROCESS (1)<br>· TRANSLATION PROCESS (1)<br>· CONVERSION PROCESS (1) | · PRE-PROCESS (2)<br>· CHARACTER RECOGNITION PROCESS (2)<br>· TRANSLATION PROCESS (2)<br>· CONVERSION PROCESS (2) |
| PLEASE SELECT IMAGE PROCESSING TO BE EXECUTED SEQUENTIALLY ~C1<br><br>  1  ▷  2  ▷  3  ▷  4 | | |

FIG. 7

| COMBINATION | PRE-PROCESS | CHARACTER RECOGNITION | CERTAINTY | PROCESSING TIME | MEMORY CAPACITY | USE FEE |
|---|---|---|---|---|---|---|
| 1 | (1) | (1) | 1 | 4 | 3 | 4 |
| 2 | (1) | (2) | 2 | 3 | 2 | 3 |
| 3 | (2) | (1) | 3 | 2 | 4 | 2 |
| 4 | (2) | (2) | 4 | 1 | 1 | 1 |

FIG. 8

OPERATION SCREEN

PLEASE DETERMINE COMBINATION TO BE USED FOR ACTUAL IMAGE WITH REFERENCE TO EVALUATION OF EACH COMBINATION OF SERIES OF PROCESSES

| COMBINATION | PRE-PROCESS | CHARACTER RECOGNITION | CERTAINTY | PROCESSING TIME | MEMORY CAPACITY | USE FEE |
|---|---|---|---|---|---|---|
| 1 | (1) | (1) | 1 | 4 | 3 | 4 |
| 2 | (1) | (2) | 2 | 3 | 2 | 3 |
| 3 | (2) | (1) | 3 | 2 | 4 | 2 |
| 4 | (2) | (2) | 4 | 1 | 1 | 1 |

START — B1

INFORMATION PROCESSING APPARATUS FOR EVALUATING PERFORMANCE OF COMBINATIONS OF PROCESSES

CROSS-REFERENCE TO RELATED APPLICATIONS

This application is based on and claims priority under 35 USC 119 from Japanese Patent Application No. 2020-147521 filed Sep. 2, 2020.

BACKGROUND

(i) Technical Field

The present disclosure relates to an information processing apparatus.

(ii) Related Art

Japanese Patent No. 5476752 describes a technique of calculating an evaluation value on the basis of a billing evaluation value, a quality evaluation value, and a delivery period evaluation value of service attribute information, the type and the service provision position of which coincide with those of service attribute information of a lower-level service acquired on the basis of associated information of service attribute information of a service recommended to be used.

SUMMARY

Services to perform processing on images such as character recognition, translation, and printing have been provided from various business operators in recent years, and there are an increasing number of cases where a plurality of processes are used in combination with each other. It is desirable for a user to combine and use processes with as high performance as possible. In the case where a plurality of processes are combined with each other, however, the performance of the same process may be varied, depending on the different process to be combined with the process.

Aspects of non-limiting embodiments of the present disclosure relate to appropriately evaluating the performance of processes in the case where a plurality of processes are used on an image in combination with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to evaluate a performance of each of a plural combinations of processes, each combination including a series of processes, the plural combinations being included in plural processes, the series of processes being configured to be performed on an image, the performance being evaluated on a basis of a result of performing the series of processes on a test image for each combination, and output an evaluation result for at least two combinations.

BRIEF DESCRIPTION OF THE DRAWINGS

An exemplary embodiment of the present disclosure will be described in detail based on the following figures, wherein:

FIG. 4 illustrates the functional configuration implemented by the information processing system;

FIG. 5 illustrates an example of a displayed operation screen;

FIG. 7 illustrates an example of evaluation result information;

FIG. 8 illustrates an example of a displayed evaluation result;

DETAILED DESCRIPTION

[1] Exemplary Embodiment

Figure 1:
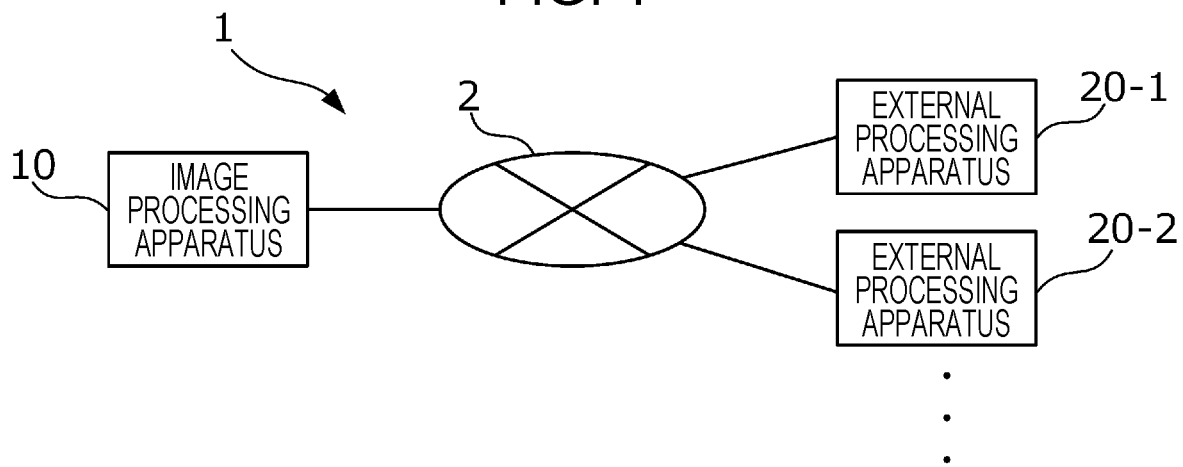
FIG. 1 illustrates the overall configuration of an information processing system according to an exemplary embodiment.

FIG. 1 illustrates the overall configuration of an information processing system 1 according to an exemplary embodiment. The information processing system 1 is a system that processes various types of information. The information processing system 1 includes a communication line 2, an image processing apparatus 10, and a plurality of external processing apparatuses 20-1, 20-2, . . . (which will be referred to as "external processing apparatuses 20" if not differentiated from each other).

The communication line 2 is a communication system that includes a mobile communication network, the Internet, etc., and relays exchange of data between devices (such as devices, terminals, and systems) that communicate with the system. The image processing apparatus 10 and the external processing apparatuses 20 are connected to the communication line 2 through wired communication. The communication between the devices and the communication line 2 is not limited to that in the example illustrated in FIG. 1, and may be either wired communication or wireless communication.

The image processing apparatus 10 and the external processing apparatuses 20 are all devices that perform information processing (hereinafter referred to "image processing") related to images. The image processing apparatus 10 performs image processing such as printing, copying, scanning, and faxing. The external processing apparatuses 20 perform image processing such as character recognition, translation, object recognition, and conversion between image file formats. The image processing executed by the plurality of external processing apparatuses 20 include mutually overlapping processes. For example, both the external processing apparatuses 20-1 and 20-2 execute translation processes.

A user who uses the information processing system 1 executes a series of image processing using at least one of the image processing apparatus 10 and the image processing apparatuses 20. For example, the user causes an image processing apparatus 10 to execute a process of scanning a document. Next, the user causes the external processing apparatus 20 to execute a process of recognizing characters in the digitalized document image, and causes a different external processing apparatus 20 to execute a process of translating the recognized characters.

As discussed above, some image processing is executable by a plurality of devices, and the performance of the image processing is varied among the devices. The information processing system 1 evaluates the performance of image processing performed by the devices. The method of evaluating the performance will be described in detail later.

Figure 2:
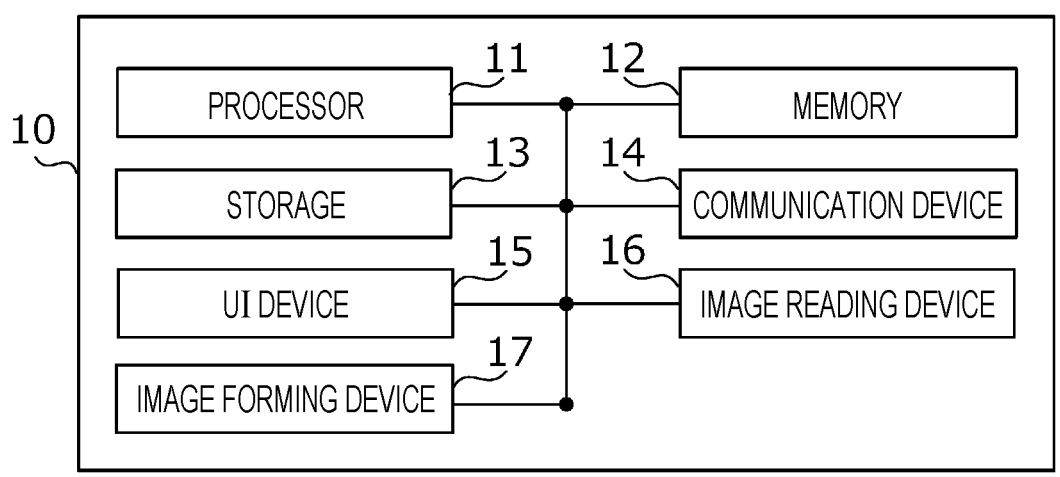
FIG. 2 illustrates the hardware configuration of an image processing apparatus.

FIG. 2 illustrates the hardware configuration of the image processing apparatus 10. The image processing apparatus 10 is a computer that includes a processor 11, a memory 12, a storage 13, a communication device 14, a user interface (UI) device 15, an image reading device 16, and an image forming device 17. The processor 11 includes a computation device such as a central processing unit (CPU), a resistor, a peripheral circuit, etc., for example. The memory 12 is a storage medium that is readable by the processor 11, and includes a random access memory (RAM), a read only memory (ROM), etc.

The storage 13 is a storage medium that is readable by the processor 11, and includes a hard disk drive, a flash memory, etc., for example. The processor 11 controls operation of various hardware components by executing a program stored in the ROM or the storage 13 using the RAM as a work area. The communication device 14 is a communication unit that includes an antenna, a communication circuit, etc. and performs communication via the communication line 2.

The UI device 15 is an interface to be provided to the user who uses the image processing apparatus 10. The UI device 15 includes a touch screen that includes a display as a display unit and a touch panel provided on the surface of the display, for example, and displays an image and receives an operation from the user. The UI device 15 may also include an operator such as a keyboard, besides the touch screen, and receives an operation on the operator.

The image reading device 16 is hardware (a so-called "scanner") that reads an image depicted on a medium such as paper, and is an image reading unit that reads an image from a medium set on the image processing apparatus 10. The image forming device 17 is a so-called printer that forms an image on a medium such as paper, and is an image forming unit that forms an image on a medium set on the image processing apparatus 10 by transferring and fixing the image using an electrophotographic system while transporting the medium.

The image reading device 16 and the image forming device 17 are not necessary components, and may not be provided in the image processing apparatus 10. In such a case, the image processing apparatus 10 may perform image processing by transmitting and receiving image data to and from an external image reading device 16 and/or an external image forming device 17.

Figure 3:
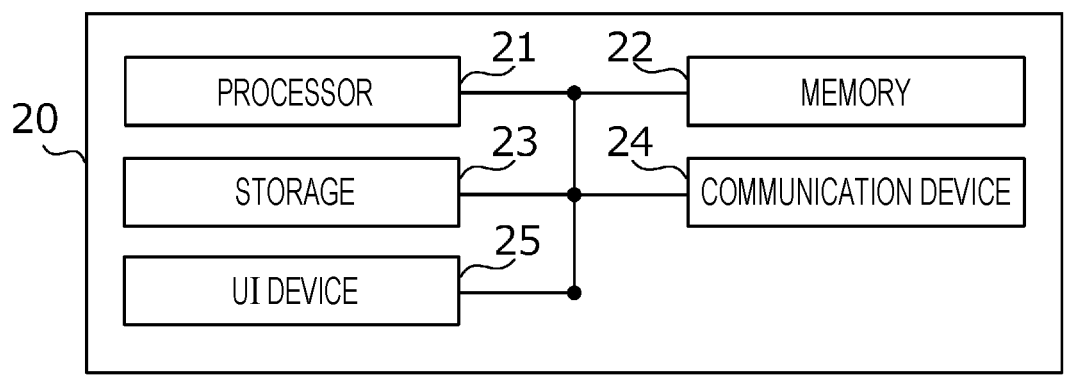
FIG. 3 illustrates the hardware configuration of an external apparatus.

FIG. 3 illustrates the hardware configuration of the external processing apparatus 20. The external processing apparatus 20 is a computer that includes a processor 21, a memory 22, a storage 23, a communication device 24, and a UI device 25. The processor 21 to the UI device 25 are hardware components that are similar to the processor 11 to the UI device 15 illustrated in FIG. 2.

In the information processing system 1, the processors of the apparatuses described above control the various sections by executing the programs to implement the functions discussed below. Operation performed by each function is depicted also as operation performed by the processor of the apparatus which implements the function.

FIG. 4 illustrates the functional configuration implemented by the information processing system 1. The image processing apparatus 10 includes an image-associated processing section 101, a process requesting section 102, a performance evaluation section 103, and an evaluation result output section 104. The external processing apparatuses 20 each include an image-associated processing section 201.

The image-associated processing section 101 of the image processing apparatus 10 executes various image processing such as the printing process discussed above. The image-associated processing section 201 of the external processing apparatus 20 executes various image processing such as the character recognition process discussed above. The process requesting section 102 of the image processing apparatus 10 requests the function of executing image processing to execute image processing requested from the user. The process requesting section 102 displays an operation screen for receiving an operation by the user.

FIG. 5 illustrates an example of the displayed operation screen. In the example in FIG. 5, the process requesting section 102 displays a list of image processes that are executable by the image processing apparatus 10 and a list of image processes that are executable by the external processing apparatus 20. In the case where the same image processing is executable by a plurality of devices, the process requesting section 102 identifies the processes by affixing numbers assigned to the devices, as with "character recognition process (1)" and "character recognition process (2)" in the drawing.

In addition, the process requesting section 102 displays a character string saying "Please select image processing to be executed sequentially." and an order image Cl that indicates the order of image processing to be executed. On this operation screen, the user drags image processing that he/she desires to execute from an image processing menu, and drops the image processing on the order image Cl. When the above operation is performed, the process requesting section 102 displays the dropped image processing on the order image Cl.

Figure 6A:
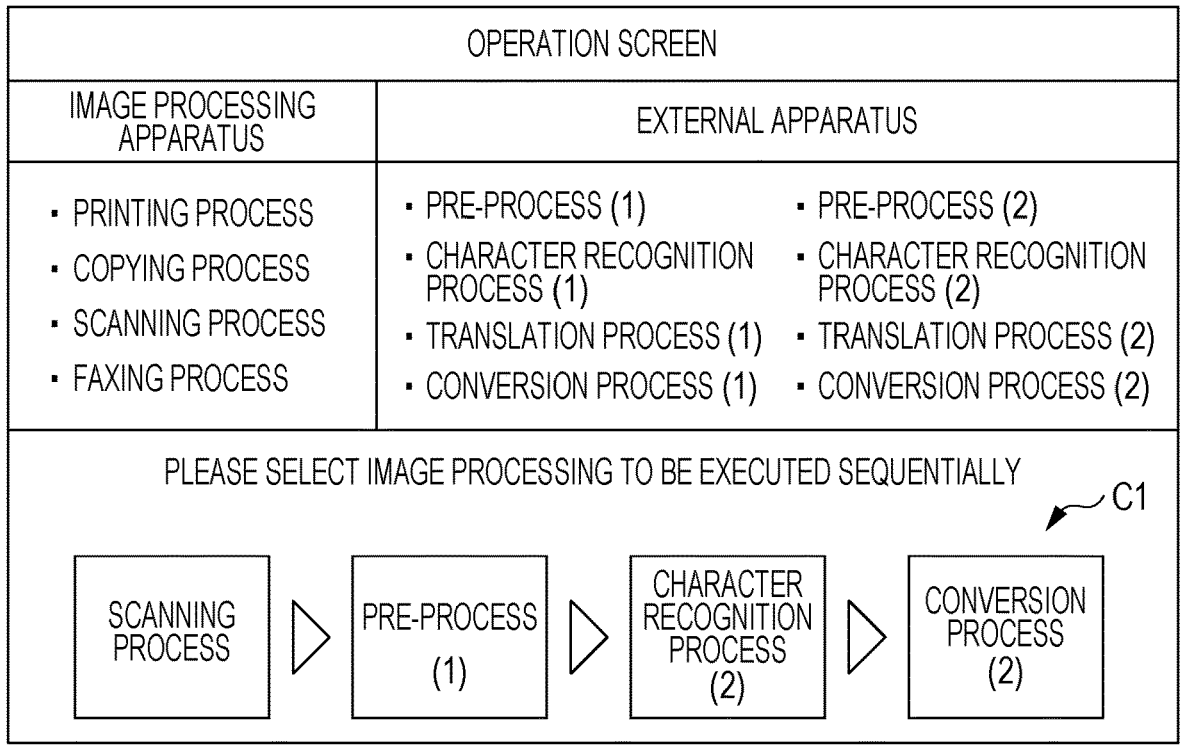
FIGS. 6A and 6B illustrate examples of a displayed order image.
Figure 6B:
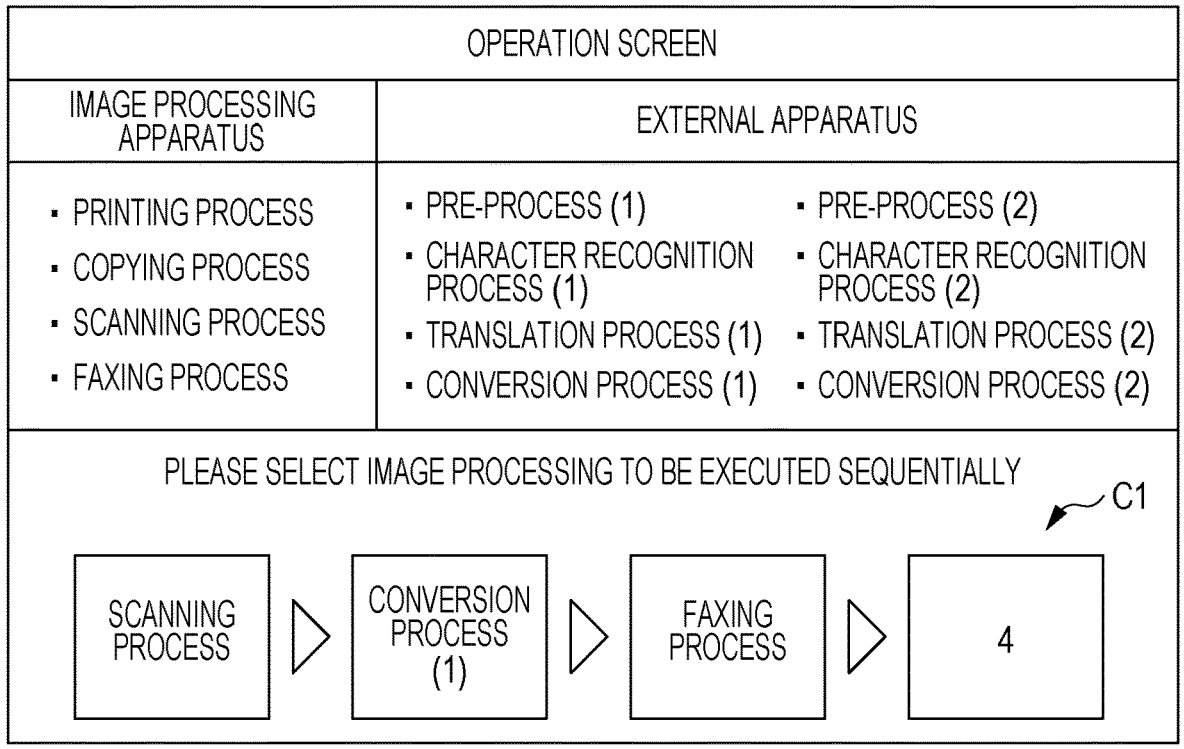

FIG. 6 illustrates an example of the displayed order image Cl. In the example in FIG. 6A, image processing is selected such that a "scan process" is executed in the first order, a "pre-process (1)" is executed in the second order, a "character recognition process (2)" is executed in the third order, and a "conversion process (2)" is executed in the fourth order. In the example in FIG. 6B, image processing is selected such that a "scan process" is executed in the first order, a "conversion process (1)" is executed in the second order, and a "facsimile process" is executed in the third order.

While the number of the series of processes is three or four in the examples in FIGS. 6A and 6B, the number of the series of processes may be two or five or more. When an operation to press an execution button (not illustrated) is performed, the process requesting section 102 requests the image-associated processing sections (image-associated processing section 101 and image-associated processing section 201) to execute the selected image processing.

The performance evaluation section 103 evaluates the performance of the processes included in each combination of the series of processes to be performed on an image on the basis of the result of performing the processes on a test image for each combination. The combination of the series of processes corresponds to a combination including the "scan process", the "pre-process (1)", the "character recognition process (2)", and the "conversion process (2)" in the example in FIG. 6A, and corresponds to a combination including the "scan process", the "conversion process (1)", and the "facsimile process" in the example in FIG. 6B, for example.

Performance evaluation by the performance evaluation section 103 is performed in advance before the user starts to use the information processing system 1. Performance evaluation may also be performed after the start of use, when a new function has been added. The performance evaluation section 103 evaluates performance in the case where an evaluation operation for evaluating the performance of a process has been performed. The evaluation operation may be an operation to determine a combination of a series of processes and an operation to designate a test image, for example.

The operation to determine a combination of a series of processes is performed as in the examples in FIGS. 6A and 6B. The operation to designate a test image is an operation to update a test image file prepared in advance to the image processing apparatus 10. In the case where the scan process is included, an operation to scan paper on which a test image has been printed is performed as the operation to designate a test image.

When an evaluation operation is performed, the performance evaluation section 103 requests the process requesting section 102 to perform the series of processes determined through the evaluation operation for the test image designated through the evaluation operation. The process requesting section 102 requests the image-associated processing sections (image-associated processing section 101 and image-associated processing section 201) to perform the processes on the test image as requested. The image-associated processing sections execute the processes on the test image in accordance with the received request.

When the processes on the test image are executed, the image-associated processing sections supply the performance evaluation section 103 with result information that indicates the result of the executed processes. Examples of the result information include the time required for the processes, the size of the memory used for the processes, the certainty of recognized characters (in the case of the character recognition process), and the use fee. The performance evaluation section 103 evaluates the performance of the processes included in each combination discussed above on the basis of the supplied result information.

The performance evaluation section 103 prepares evaluation result information in which combinations of the series of processes and orders of the performance are correlated with each other, for example.

FIG. 7 illustrates an example of the evaluation result information. In the example in FIG. 7, four combinations of the pre-process and the character recognition process (combination 1=(1) and (1), combination 2=(1) and (2), combination 3=(2) and (1), and combination 4=(2) and (2)) and orders of the performance are correlated with each other.

Combination 1 is in the first place for the certainty, the fourth place for the processing time and the use fee, and the third place for the memory capacity. Combination 2 is in the second place for the certainty and the memory capacity, and the third place for the processing time and the use fee. Combination 3 is in the second place for the processing time and the use fee, the third place for the certainty, and the fourth place for the memory capacity. Combination 4 is in the fourth place for the certainty, and the first place for the processing time, the memory capacity, and the use fee. The performance evaluation section 103 supplies the prepared evaluation result information to the evaluation result output section 104.

The evaluation result output section 104 outputs the result of evaluation for at least two combinations of the series of processes on the basis of the supplied evaluation result information. The evaluation result output section 104 outputs a result image, which represents the evaluation result information as it is, as the evaluation result, for example.

FIG. 8 illustrates an example of the displayed evaluation result. In the example in FIG. 8, the evaluation result output section 104 outputs an operation screen that includes the evaluation result information indicated in FIG. 7 to the display of the image processing apparatus 10.

The evaluation result output section 104 outputs an operation screen that includes a character string saying "Please determine combination to be used for actual image with reference to evaluation of each combination of series of processes" and a start button B1. Upon seeing the output evaluation result, the user determines the combination that will exhibit the most desirable performance, and performs an operation to select the combination. In the example in FIG. 8, the evaluation result output section 104 indicates Combination 4, which has been selected, as surrounded by a thick frame.

When an operation to select a combination and press the start button B1 is performed, the evaluation result output section 104 supplies the selected combination to the process requesting section 102. The process requesting section 102 requests the image-associated processing sections (image-associated processing section 101 and image-associated processing section 201) to execute the series of processes indicated by the supplied combination. The image-associated processing sections execute the processes on the actual image in accordance with the received request.

The image processing apparatus 10 performs an evaluation process for evaluating the performance of the series of processes using the configuration described above.

Figure 9:
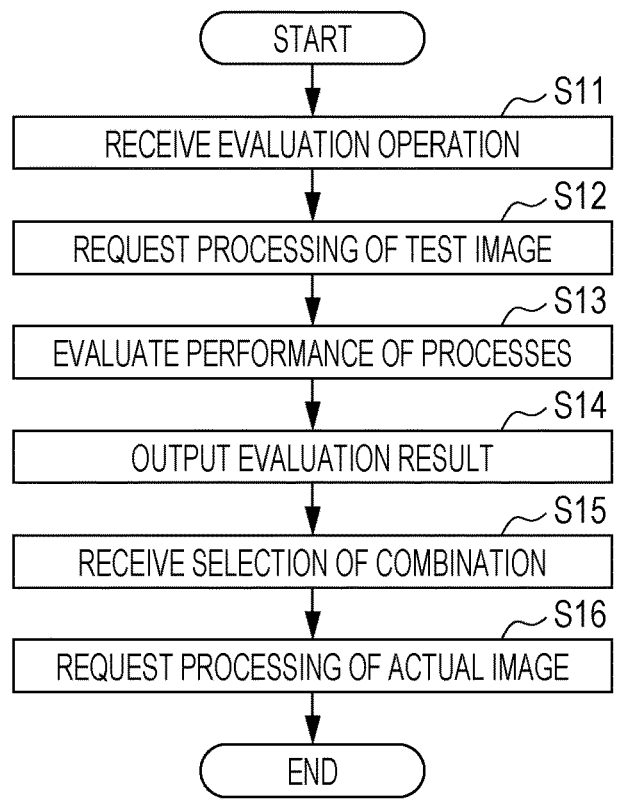
FIG. 9 illustrates an example of operation procedures in an evaluation process.

FIG. 9 illustrates an example of operation procedures in the evaluation process. First, the image processing apparatus 10 (performance evaluation section 103) receives an evaluation operation for evaluating the performance of processes (an operation to determine a combination of a series of processes and an operation to designate a test image) (step S11).

Next, the image processing apparatus 10 (process requesting section 102) requests the image-associated processing sections to perform the series of processes determined through the evaluation operation on the test image designated through the evaluation operation (step S12). Subsequently, the image processing apparatus 10 (performance evaluation section 103) evaluates the performance of the processes included in each combination of the series of processes to be performed on an image on the basis of the result of performing the processes on a test image for each combination (step S13).

Next, the image processing apparatus 10 (evaluation result output section 104) outputs the result of evaluation for at least two combinations of the series of processes (step S14). Subsequently, the image processing apparatus 10 (evaluation result output section 104) receives an operation to select any of the two or more combinations that have been output (step S15). Then, the image processing apparatus 10 (process requesting section 102) requests the image-associated processing sections to execute the series of processes indicated in the selected combination (step S16).

In the information processing system 1, as described above, a plurality of processes to be performed on an image are used in combination. When a plurality of processes are combined in this manner, the performance of the processes may be varied in the case where the preceding and following processes are different, even if the same data are to be processed. In the present exemplary embodiment, the performance is evaluated on the basis of the result of actually executing a series of processes on a test image.

[2] Modifications

The exemplary embodiment discussed above is merely exemplary of the present disclosure, and may be modified as follows. The exemplary embodiment and modifications may be implemented in combination as necessary.

[2-1] Determination to Perform Evaluation

In the exemplary embodiment, the performance evaluation section 103 evaluates the performance of processes at all times. However, the present disclosure is not limited thereto. The performance evaluation section 103 may not evaluate the performance of processes that do not meet an evaluation condition, among the plurality of processes.

Specifically, the performance evaluation section 103 determines that processes, the performance of which was evaluated previously, among the plurality of processes, do not meet an evaluation condition, for example. The performance evaluation section 103 stores identification information (such as a process identification (ID)) for identifying processes, the performance of which has been evaluated, and the evaluation result in correlation with each other, for example. If identification information on a new combination of a series of processes has been stored in the case where the new combination of processes is determined through an evaluation operation, the performance evaluation section 103 determines that the processes do not meet the evaluation condition, and does not evaluate the performance of the processes.

Meanwhile, if identification information on a new combination of a series of processes has not been stored in the case where the new combination of processes is determined through an evaluation operation, the performance evaluation section 103 determines that the processes meet the evaluation condition, and evaluates the performance of the processes.

The performance evaluation section 103 may determine that a combination of processes, the performance of which was evaluated previously, among the plurality of processes, do not meet an evaluation condition, for example. In this case, the performance evaluation section 103 stores a combination of identification information for identifying processes, the performance of which has been evaluated, and the evaluation result in correlation with each other, for example.

If a combination of identification information on processes that is the same as a new combination of a series of processes has been stored in the case where the new combination of processes is determined through an evaluation operation, the performance evaluation section 103 determines that the processes do not meet the evaluation condition, and does not evaluate the performance of the processes. Meanwhile, if a combination of identification information on processes that is the same as the combination of processes has not been stored, the performance evaluation section 103 determines that the processes meet the evaluation condition, and evaluates the performance of the processes.

In addition, the performance evaluation section 103 may determine that processes, the result of which does not reach a determined criterion, among the plurality of processes, do not meet an evaluation condition. The performance evaluation section 103 determines a threshold for the processing time of each process as a criterion, for example, and determines that the process result does not reach the criterion and does not evaluate the process performance for processes, the processing time of which for processing a test image is equal to or more than the threshold.

In addition, the performance evaluation section 103 may determine whether or not an evaluation condition is met using existing information on processes, the performance of which has been evaluated, among the plurality of processes. Examples of the existing information include the result of evaluating the processes previously. In such a case, the performance evaluation section 103 determines that processes, the performance of which was evaluated previously, among the plurality of processes, do not meet an evaluation condition, as in the example discussed earlier.

In addition, in the case where a plurality of image processing apparatuses 10 are used, for example, the result of evaluation performed by a certain image processing apparatus 10 may be used as the existing information on processes, the performance of which is evaluated by a different image processing apparatus 10. In such a case, the performance evaluation section 103 determines that processes, the performance of which was evaluated by the certain image processing apparatus 10, among the plurality of processes, do not meet an evaluation condition, for example.

[2-2] Determination to Output Evaluation Result

In the exemplary embodiment, the evaluation result output section 104 outputs the result of evaluating the performance of processes at all times. However, the present disclosure is not limited thereto. The evaluation result output section 104 may not output the result of evaluating the performance of processes that do not meet an output condition, among the plurality of processes.

Specifically, the evaluation result output section 104 determines that processes, the performance of which was evaluated previously, among the plurality of processes, do not meet an output condition, for example. The evaluation result output section 104 stores identification information for identifying processes, the performance of which has been evaluated by the performance evaluation section 103, and the evaluation result in correlation with each other, for example.

Then, if identification information on processes included in a new combination of processes has been stored in the case where the performance of the processes included in the combination of processes is evaluated, the evaluation result output section 104 determines that an output condition is not met, and does not output the result of evaluating the performance of the processes.

The evaluation result output section 104 may determine that processes, the result of which does not reach a determined criterion, among the plurality of processes, do not meet an output condition. The evaluation result output section 104 determines a threshold for the processing time of each process as a criterion, for example, and determines that the process result does not reach the criterion and does not output the result of evaluating the performance of processes, the processing time of which for processing a test image is equal to or more than the threshold.

[2-3] Automatic Selection of Actual Process

In the exemplary embodiment, the user selects a combination of processes to be used for the actual processing on the basis of the output evaluation result. However, the present disclosure is not limited thereto.

Figure 10:
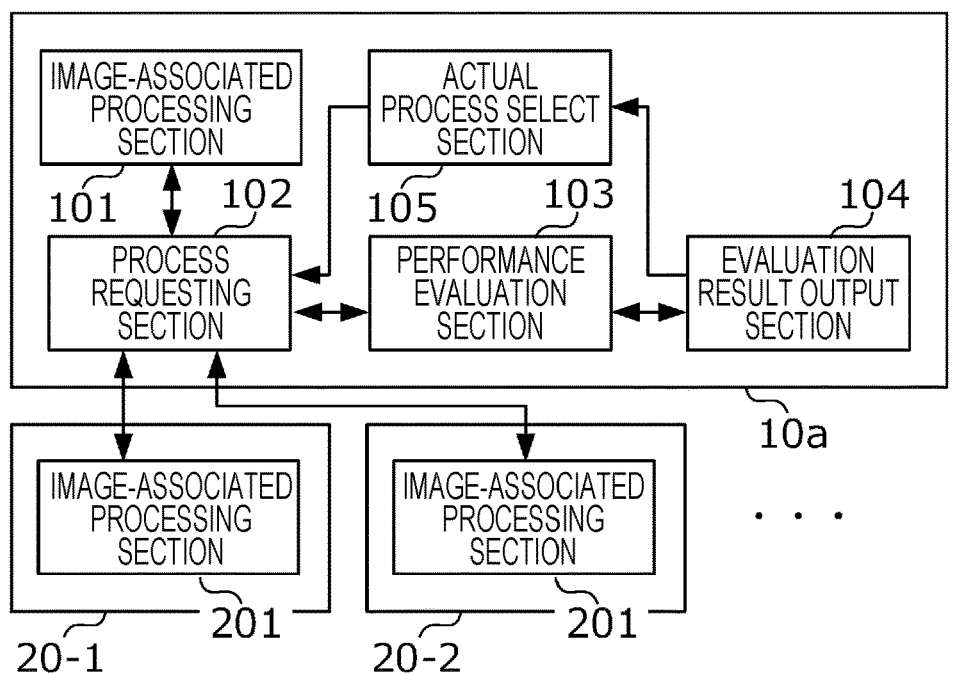
FIG. 10 illustrates an example of the functional configuration implemented in a modification.

FIG. 10 illustrates an example of the functional configuration implemented in a modification. In the example in FIG.

10, an image processing apparatus 10a includes an actual process select section 105 in addition to the various sections illustrated in FIG. 4.

In the present modification, the evaluation result output section 104 outputs the evaluation result to the actual process select section 105, rather than the display. The actual process select section 105 selects a combination of processes, the evaluated performance of which meets a select condition determined in advance, among a plurality of combinations of processes. The actual process select section 105 determines that a combination of processes, the average rank of which is the highest, meets the select condition in the case where the result of evaluating the performance of the processes is represented in ranks as in FIG. 7, for example.

In the example in FIG. 7, the average ranks for Combinations 1, 2, 3, and 4 are $(1+4+3+4)÷4=3$, $(2+3+2+3)÷4=2.5$, $(3+2+4+2)÷4=2.75$, and $(1+4+3+4)÷4=1.75$, respectively, and thus the actual process select section 105 determines that Combination 4 meets the select condition. The actual process select section 105 may determine average ranks with a weight given to each type of the performance.

The actual process select section 105 selects a combination that meets the select condition, and supplies the selected combination to the process requesting section 102. The process requesting section 102 requests the image-associated processing sections to execute the series of processes indicated by the supplied combination. The image-associated processing sections processes the actual image through the requested series of processes, that is, the processes in the combination selected by the actual process select section 105.

[2-4] Evaluation with Real Image

In the exemplary embodiment, the performance evaluation section 103 evaluates performance on the basis of the result of processing the test image designated by the user. However, the present disclosure is not limited thereto. The performance evaluation section 103 may evaluate the performance of processes included in each combination using the actual image as a test image in the case where the performance of a certain process performed on the actual image is low compared to the performance of the process evaluated previously.

In the present modification, when processes on the actual image are executed, the image-associated processing sections supply the performance evaluation section 103 with result information that indicates the result of the executed processes. The performance evaluation section 103 evaluates the performance of processes included in each combination on the basis of the supplied result information on the actual process as in the exemplary embodiment. The performance evaluation section 103 compares the evaluation result in the actual process and the evaluation result obtained when processing the test image, and determines whether or not the difference between the two evaluation results is equal to or more than a threshold.

In the case where the difference between the two evaluation results is equal to or more than the threshold, the performance evaluation section 103 prepares evaluation result information that indicates the evaluation result with the actual image, and supplies the evaluation result information to the evaluation result output section 104.

[2-5] Functional Configuration

The configuration of functions implemented by the information processing system 1 is not limited to that illustrated in FIG. 4 etc. For example, while the process requesting section 102 of the image processing apparatus 10 requests both a process for the test image and a process for the actual image in the present exemplary embodiment, such operations may be performed by separate functions.

In addition, the operations performed by the performance evaluation section 103 and the evaluation result output section 104 may be performed by a single function, for example. In addition, the functions implemented by the image processing apparatus 10 may be implemented by two or more information processing apparatuses or a computer resource provided by a cloud service. In short, the range of operation performed by each function and the device that implements each function may be determined freely as long as the functions indicated in FIG. 4 etc. are implemented by the information processing system as a whole.

[2-6] Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

[2-7] Category of the Disclosure

The present disclosure may also be grasped as an information processing system (exemplified by the information processing system 1) that includes an information processing apparatus, besides an information processing apparatus such as an image processing apparatus and an external processing apparatus. Alternatively, the present disclosure may also be grasped as an information processing method for implementing the processes performed by the information processing apparatus, or as a program for causing a computer that controls the information processing apparatus to function. The program may be provided in the form of a storage medium such as an optical disc that stores the program, downloaded to a computer via a communication line such as the Internet and installed to become usable, etc.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
evaluate a performance of each of a plurality of combinations of processes, each combination including a series of processes, the plurality of combinations being included in a plurality of processes, the series of processes being configured to be performed on an image, the performance being evaluated on a basis of a result of performing the series of processes on a test image for each combination, and output an evaluation result for at least two combinations,
wherein the processor is configured not to output the evaluation result for processes that do not meet an output condition, among the plurality of processes.

2. The information processing apparatus according to claim 1,
wherein the processor is configured not to evaluate the performance for processes that do not meet an evaluation condition, among the plurality of processes.

3. The information processing apparatus according to claim 2,
wherein the processor is configured to determine whether or not the evaluation condition is met using existing information on processes, the performance of which has been evaluated, among the plurality of processes.

4. The information processing apparatus according to claim 3,
wherein the processor is configured to determine that processes, the result of which does not reach a determined criterion, among the plurality of processes, do not meet the evaluation condition.

5. The information processing apparatus according to claim 3,
wherein the processor is configured to select a combination of processes, the evaluated performance of which meets a selection condition determined in advance, among the plurality of combinations of processes, and process an actual image.

6. The information processing apparatus according to claim 2,
wherein the processor is configured to determine that a combination of processes, the performance of which was evaluated previously, among the plurality of processes, does not meet the evaluation condition.

7. The information processing apparatus according to claim 6,
wherein the processor is configured to determine that processes, the result of which does not reach a determined criterion, among the plurality of processes, do not meet the evaluation condition.

8. The information processing apparatus according to claim 7,
wherein the processor is configured to select a combination of processes, the evaluated performance of which meets a selection condition determined in advance, among the plurality of combinations of processes, and process an actual image.

9. The information processing apparatus according to claim 6,
wherein the processor is configured to select a combination of processes, the evaluated performance of which meets a selection condition determined in advance, among the plurality of combinations of processes, and process an actual image.

10. The information processing apparatus according to claim 2,
wherein the processor is configured to determine that processes, the result of which does not reach a determined criterion, among the plurality of processes, do not meet the evaluation condition.

11. The information processing apparatus according to claim 10,
wherein the processor is configured to select a combination of processes, the evaluated performance of which meets a selection condition determined in advance, among the plurality of combinations of processes, and process an actual image.

12. The information processing apparatus according to claim 4,
wherein the processor is configured to select a combination of processes, the evaluated performance of which meets a selection condition determined in advance, among the plurality of combinations of processes, and process an actual image.

13. The information processing apparatus according to claim 2,
wherein the processor is configured to select a combination of processes, the evaluated performance of which meets a selection condition determined in advance, among the plurality of combinations of processes, and process an actual image.

14. The information processing apparatus according to claim 1,
wherein the processor is configured to determine that processes, the performance of which was evaluated previously, among the plurality of processes, do not meet the output condition.

15. The information processing apparatus according to claim 14,
wherein the processor is configured to determine that processes, the result of which does not reach a determined criterion, among the plurality of processes, do not meet the output condition.

16. The information processing apparatus according to claim 1,
wherein the processor is configured to determine that processes, the result of which does not reach a determined criterion, among the plurality of processes, do not meet the output condition.

17. The information processing apparatus according to claim 1,
wherein the processor is configured to select a combination of processes, the evaluated performance of which meets a selection condition determined in advance, among the plurality of combinations of processes, and process an actual image.

18. The information processing apparatus according to claim 1,
wherein the processor is configured to evaluate the performance of the series of processes included in each combination using an actual image as the test image in a case where a performance obtained by processing the actual image is low compared to the evaluated performance.

* * * * *